(12) United States Patent
Koronya et al.

(10) Patent No.: US 8,633,645 B2
(45) Date of Patent: Jan. 21, 2014

(54) FLUORESCENT LAMP ASSEMBLY WITH IMPROVED RUN-UP

(71) Applicant: General Electric Company, Schenectady, NY (US)

(72) Inventors: Csaba Koronya, Nagykanizsa (HU); Péter Lucz, Budapest (HU); Gábor Szabó, Budapest (HU); János Gergely Kállay, Budapest (HU); Dániel Gábor Csiki, Budapest (HU)

(73) Assignee: General Electric Company, Schenectady, NV (US)

( * ) Notice: Subject to any disclaimer, the term of this patent is extended or adjusted under 35 U.S.C. 154(b) by 0 days.

(21) Appl. No.: 13/860,615

(22) Filed: Apr. 11, 2013

(65) Prior Publication Data

US 2013/0221849 A1     Aug. 29, 2013

Related U.S. Application Data

(63) Continuation-in-part of application No. 13/292,150, filed on Nov. 9, 2011, and a continuation-in-part of application No. 13/669,517, filed on Nov. 6, 2012.

(51) Int. Cl.
    *H01J 11/00*     (2012.01)
(52) U.S. Cl.
    USPC .......................................... 313/607; 313/234
(58) Field of Classification Search
    USPC ..................... 313/234, 594, 607, 341, 490
    See application file for complete search history.

(56) References Cited

U.S. PATENT DOCUMENTS

| 3,339,100 A | | 8/1967 | Menelly |
| 4,105,910 A | | 8/1978 | Evans |
| 4,140,385 A | * | 2/1979 | Shaw et al. .................. 399/220 |

(Continued)

FOREIGN PATENT DOCUMENTS

| CA | 2144260 | 9/1995 |
| EP | 0673057 | 9/1995 |

(Continued)

OTHER PUBLICATIONS

Search Report and Written Opinion from corresponding PCT Application No. PCT/US2012/063763, dated Apr. 9, 2013.

*Primary Examiner* — Vip Patel
(74) *Attorney, Agent, or Firm* — Peter T. DiMauro; Global Patent Operation

(57) ABSTRACT

A discharge lamp having an improved run-up time is disclosed. In an embodiment, the discharge lamp includes a light-transmissive discharge tube extending from a first end to a second end and having an inner surface and an outer surface, a phosphor coating layered onto the inner surface of the discharge tube, and a fill gas composition capable of sustaining a discharge sealed within the discharge tube. Also included is a resistive heating wire positioned about the outer surface of the discharge tube. In some embodiments, a lamp driver circuit is included that operates when the lamp is turned ON to provide power to electrodes in the discharge tube and to provide power to the resistive heating wire, and operates to disconnect power from the resistive heating wire when the discharge lamp achieves a predetermined percentage of its stabilized lumen output.

17 Claims, 5 Drawing Sheets

(56) References Cited

U.S. PATENT DOCUMENTS

| | | | |
|---|---|---|---|
| 5,438,235 | A | 8/1995 | Sommerer et al. |
| 5,739,633 | A | 4/1998 | Biro et al. |
| 5,808,414 | A | 9/1998 | Wharmby et al. |
| 6,417,615 | B1 | 7/2002 | Yasuda et al. |
| 6,727,649 | B1 * | 4/2004 | Yano et al. ............ 313/607 |
| 7,511,431 | B2 | 3/2009 | Lesch et al. |
| 7,550,925 | B2 | 6/2009 | Lesch et al. |
| 7,592,742 | B2 | 9/2009 | Takahara et al. |
| 7,928,644 | B1 | 4/2011 | Tokes et al. |
| 2005/0062423 | A1 | 3/2005 | Shibahara et al. |
| 2006/0226781 | A1 | 10/2006 | Allen et al. |
| 2006/0284561 | A1 | 12/2006 | Nishimura et al. |
| 2010/0134000 | A1 | 6/2010 | Carter et al. |
| 2011/0012509 | A1 | 1/2011 | Wursching et al. |
| 2011/0181176 | A1 | 7/2011 | Mora et al. |
| 2011/0234094 | A1 | 9/2011 | Wursching et al. |
| 2012/0019136 | A1 | 1/2012 | Wursching et al. |

FOREIGN PATENT DOCUMENTS

| | | |
|---|---|---|
| EP | 0769805 A2 | 4/1997 |
| GB | 1192999 A | 5/1970 |
| JP | 0831374 | 2/1996 |
| JP | 2000195465 A | 7/2000 |
| WO | 2008029369 | 3/2008 |

* cited by examiner

FLUORESCENT LAMP ASSEMBLY WITH IMPROVED RUN-UP

BENEFIT TO EARLIER PRIORITY UNDER 35 USC 120

This application is a continuation-in-part of co-pending, commonly owned patent application Ser. No. 13/292,150 (GE Reference 248258-1 US), filed 9 Nov. 2011, and is also a continuation-in-part of co-pending, commonly owned patent application Ser. No. 13/669,517 (GE Reference 248258-2 US), filed 6 Nov. 2012.

FIELD OF THE INVENTION

Embodiments of the present invention generally relates to a fluorescent lamp having improved run-up properties, and in particular to an amalgam dosed compact fluorescent lamp (CFL) having an external heating filament to increase the heating up rate of a discharge tube resulting in a shorter run-up time.

BACKGROUND OF THE INVENTION

Most commercially available and widely known low-pressure fluorescent discharge lamps are known as fluorescent lamps (FLs). Recently, compact fluorescent lamps (CFLs) have been designed to replace conventional incandescent lamps in a wide range of home and commercial applications. FLs and CFLs advantageously have lower power consumption and longer life properties as compared to incandescent lamps. In order to provide CFLs that resemble conventional incandescent lamps, a bulb shaped outer envelope may be provided that encapsulates the CFLs. The advantages of these CFL lamps are low power consumption and long lifetime. However, one of the main disadvantages of FLs, including CFLs, is their relatively long run-up time.

As mentioned above, a disadvantage of FLs and CFLs is their relatively long run-up time. Run-Up time may be defined as the time between the application of power to the FL or CFL and the time when the light output first reaches a specified percentage (usually 80%) of stable light output. In general, consumers expect a lamp to emit light immediately after, or substantially instantaneously with, the flipping of a switch to the ON position. However, some long-life FLs need about 0.5 to 1.5 seconds to preheat the cathodes or electrodes before starting to emit any light output. Thus, the FL emits no light before preheating is complete. In addition, in some cases once an arc discharge is initiated, an FL still requires an additional 20 seconds to fifteen (15) minutes or more to reach a certain percentage of its stabilized luminous flux or stable light output. Thus, the time for an FL to reach a predetermined percentage of its stabilized luminous flux can vary in a wide range.

Prior attempts to reduce the run-up time of a FL utilizing an amalgam mercury dose incorporated an auxiliary amalgam near one of the electrodes in the lamp. Since this arrangement results in the mercury from the auxiliary amalgam being vaporized shortly after the FL is switched ON, the run-up period is reduced. However, an instant light feature is not provided.

Another known solution combines a FL and an incandescent lamp in one unit. A suggested procedure involves simultaneously turning on the incandescent lamp and the FL when power is applied so that instant light (from the incandescent lamp) is provided, and then to subsequently switch OFF the incandescent lamp when the FL reaches a stable light output. But such a solution is inefficient and does not provide an effective manner for warming up the mercury source of the FL.

Yet another known solution is to apply power to only the incandescent lamp portion of a combined incandescent-FL unit when the lamp assembly is turned ON, and then once a predetermined temperature is reached, turn OFF the incandescent lamp and turn ON the FL. Although a thermal switch of such an arrangement aids in starting the FL in a low temperature, ambient condition, such an arrangement and method does not improve the run-up time of the lamp assembly.

External heating methods have also been attempted in order to reduce run-up times. In particular, one method involved painting a non-transparent metallic element, such as silver chloride paint, onto the outer surface of the glass tube of an FL to improve heating. However, using such a metallic coating results in a high loss of total lumen output of the lamp. In another method, a transparent resistive metallic layer such as fluorine doped tin-oxide (FTO) was applied onto the outer surface of the glass tube of a FL. But even in this case a shading effect occurs, which limits the light output.

Thus, a need exists for a method and/or apparatus for improving the warm-up or run-up time of a FL that overcomes the problems described above.

SUMMARY OF THE INVENTION

Disclosed are apparatus and methods for providing a discharge lamp having an improved run-up time. In an embodiment, the discharge lamp includes a light-transmissive discharge tube extending from a first end to a second end and having an inner surface and an outer surface, a phosphor coating in which amalgam-forming material is dispersed layered onto the inner surface of the discharge tube, and a fill gas composition capable of sustaining a discharge sealed within the discharge tube. Also included is a resistive heating wire positioned about the outer surface of the discharge tube. In some embodiments, a lamp driver circuit is included that operates when the lamp is turned ON to provide power to electrodes in the discharge tube and to provide power to the resistive heating wire, and operates to disconnect power from the resistive heating wire when the discharge lamp achieves a predetermined percentage of its stabilized lumen output.

A method of forming a fluorescent lamp is also disclosed. The process includes providing a discharge tube having a first electrode on a first end and a second electrode on a second end for exciting a fill gas contained within an inner cavity of the discharge tube to produce light. The discharge tube having a first end and a second end, and an inner surface and an outer surface. The method also includes providing a resistive heating wire about the outer surface of the discharge tube and providing a driver circuit comprising a lamp driver and a heating driver. The lamp driver is operably connected to provide power to the first electrode and the second electrode, and the heating driver is operably connected to provide power to the resistive heating wire to heat the discharge tube.

BRIEF DESCRIPTION OF THE DRAWINGS

Aspects and/or features of the invention and many of their attendant benefits and/or advantages will become more readily apparent and appreciated by reference to the detailed description when taking in conjunction with the accompanying drawings, which drawings may not be drawn to scale, wherein.

The detailed description below utilizes numerical and letter designations to reference features and/or aspect in the drawings. Like or similar designations in the various drawings refer to like or similar elements of embodiments according to the invention.

DETAILED DESCRIPTION

Pursuant to some embodiments, in order to increase the run-up time of a fluorescent lamp (FL) such as a compact fluorescent lamp (CFL), indium powder is mixed in with a phosphor material that is utilized to coat the inner surface of the discharge tube. Integrating the indium powder into the phosphor layer of the discharge lamp increases the diffusion properties of the mercury in the light-transmissive envelope so that the mercury can quickly diffuse throughout the discharge tube or envelope. In addition, an external resistive heating wire or heating element is included which is connected to a ballast circuit which energizes the resistive heating element in the ON state to decrease the heat up time of the discharge tube. In some embodiments, the heating element is a resistive wire that produces enough dissipating heating power to ensure a high enough temperature for the indium so as to release its mercury content. Utilization of amalgam-forming material and phosphor coating mixture on the inner surface of the discharge tube along with adding an external resistive heating wire about the entire outer surface of the discharge tube results in a faster run-up time of the light output of the discharge lamp as compared to prior art FL or CFL assemblies. In particular, the diffusion of mercury begins from the entire volume of the discharge tube which results in an instant light during run-up in contrast to conventional FL lamps that may include auxiliary amalgam (wherein the lamp gradually becomes brighter from the cathodes towards the colder sections of the bulb or envelope). In the embodiments described herein, the mercury diffusion path is much shorter as compared to conventional run-up methods and/or arrangements.

The description that follows relates to a mercury discharge fluorescent lamp that includes a sealed light-transmissive envelope (or discharge tube) having a generally circular cross section for describing embodiments. But it is contemplated that other types and shapes of lamps could be used and are within the scope of this disclosure, including mercury fluorescent lamps, low dose mercury, and high output fluorescent lamps. The lamp may be linear, but any size, shape or cross section type may be used. For example, some embodiments include compact fluorescent lamps (CFLs) having a folded or wrapped topology so that the overall length of the lamp is much shorter or compact than the unfolded length of the glass tube or envelope. The varied modes of manufacture and configurations for linear FLs as well as CFLs are generally known to persons skilled in the art.

Figure 1:
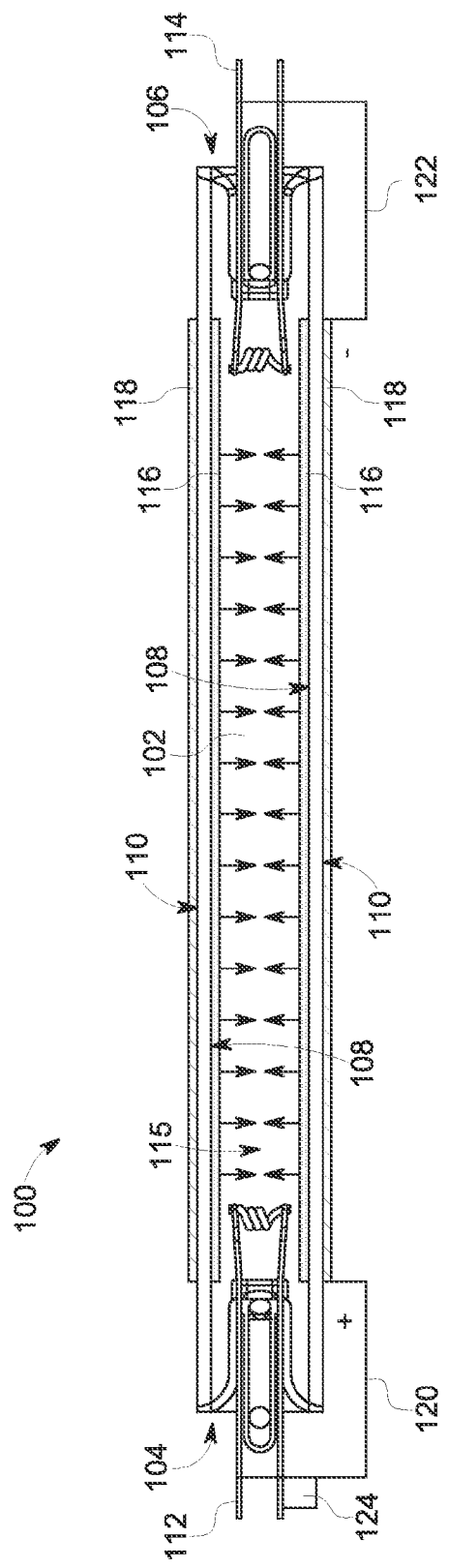
FIG. 1 illustrates a low-pressure discharge lamp in accordance with an embodiment of the invention.

The lamp described below with reference to FIG. 1 is a low-pressure discharge lamp (e.g. fluorescent lamp (FL)). Such FLs typically include at least one light-transmissive envelope or discharge tube which can be made of a vitreous (e.g., glass) material and/or ceramic, or any suitable material which allows for the transmission of at least some visible light. A fill-gas composition capable of sustaining an electric discharge is sealed inside the discharge tube. The lamp also includes at least one phosphor layer on the inner surface of the discharge tube or envelope, and one or more electrical leads at least partially disposed within the discharge tube for providing electric current.

FIG. 1 illustrates a FL 100 according to an embodiment. The FL 100 includes a discharge tube 102 or light-transmissive envelope having a circular cross section, a first end 104, a second end 106, an inner surface 108, and an outer surface 110. A first electrode 112 is positioned at the first end 104 of the discharge tube, and a second electrode 114 is positioned at the second end 106 of the discharge tube, and both the first electrode 112 and second electrode 114 extend into an inner cavity 115 of the discharge tube. In some embodiments, a coating 116 comprising a phosphor and an amalgam-forming material (e.g., a mixture of a phosphor and an amalgam-forming material), is disposed or layered onto the inner surface 108 of the discharge tube. In some implementations, the coating 116 includes an indium and phosphor mixture. A discharge-sustaining fill is sealed within the discharge tube (within the inner cavity 115) and may be composed of an inert gas, for example, argon, xenon, neon or krypton at a low pressure in combination with a mercury vapor to provide the low vapor pressure for lamp operation.

Referring again to FIG. 1, an external resistive heating wire 118 is disposed about the outer surface 110 of the discharge tube 102. The external resistive heating wire 118 is connected to a pair of heating electrodes 120, 122 (which may also be part of a ballast circuit) which energizes the resistive heating wire by applying an electric current when the FL 100 is switched to the ON state to create a heating effect. In particular, a lamp driver 124 is electrically connected to the first and second electrodes 112, 114 and to the heating electrodes 120, 122. When the lamp is switched ON, the lamp driver 124 operates to both create the heating effect by applying electrical current to the resistive heating wire 118 and to illuminate the lamp. The external heating of the discharge tube 102 increases the rate at which mercury evaporates within the inner cavity 115 during lamp start, illustrated by the opposing arrows shown in the inner cavity 115 of the discharge tube 102. Thus, the time needed for the lamp 100 to reach its maximum lumen output is reduced with regard to conventional FLs because the mercury diffusion path (along the entire length of the discharge tube) is much shorter. In addition, in some implementations when the lamp reaches a predetermined percent (for example, 80%) of its stabilized lumen output then the external resistive heating wire circuit is disconnected.

In some embodiments, the external resistive heating wire 118 is a wire disposed about and in contact with the outer surface 110 of the discharge tube between contacts of the heading electrodes 120 and 122. In an implementation, the external resistive heating wire is a wire that is spun about or twisted around to contact the outer surface 110 along the entire length of the discharge tube. In another implementation, the external resistive heating wire is a pre-shaped wire coil (wherein a mandrel may be utilized to pre-shape the wire coil) that is wrapped about the entire length of the outside surface of the discharge tube. In yet another embodiment, the resistive heating wire is a pre-braided filament net having support fibers (which may look like a sock, for example) that is provided and then drawn over the length of the discharge tube to contact the outer surface 110.

Figure 2:
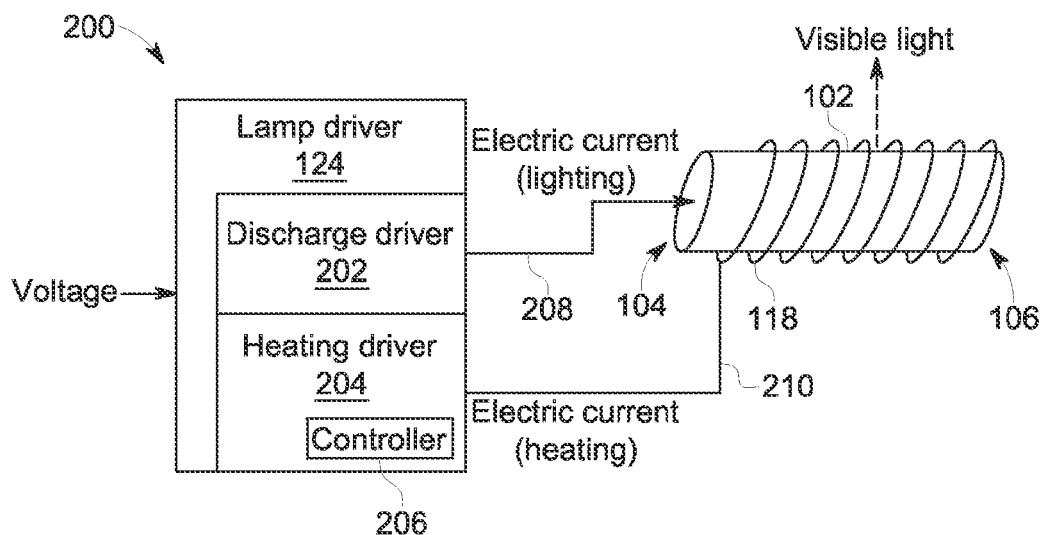
FIG. 2 is a block diagram illustrating mercury discharge lamp components of a fluorescent lamp according to an embodiment of the invention.

FIG. 2 is a block diagram 200 illustrating mercury discharge lamp components of a FL according to an embodiment. A lamp driver 124 includes a discharge driver 202 and a heating element driver 204, wherein the heating element driver 204 includes a controller 206. The discharge driver 202 provides electric current via a conductor 208 to the discharge lamp 102 for lighting purposes (e.g., via the first electrode 112 at the first end 104 of the discharge tube). Similarly, the heating element driver 204 provides electric current via a conductor 210 for heating purposes (e.g., via the first heating electrode 120) to the heating element 118 which is wrapped about or coiled around the discharge tube 102. In some embodiments, the heating driver 204 is configured to provide in the range of about 1 Watt to about 1000 Watts to the heating element 118.

The controller 206 may be configured to control the power output to the heating element 118 for a run-up period following turn ON of the FL. The controller 206 may include any suitable sensor or combination of sensors configured to monitor one or more of temperature, light output, time, and/or electrical parameters such as voltage, current and/or power of the FL or the discharge driver 202. After the run-up period, the controller 206 is operable to break the electrical connection within the heating driver 204 such that no current flows through the heating element 118. In some implementations, the controller 206 may be tuned for each particular FL to provide sufficient warm-up heating to the discharge tube 102, particularly in the areas away from the first end 104 and the second end 106 to allow for the quick run-up to full lumen output or full illumination of the FL. In some embodiments, the run-up time to reach a predetermined percentage of the full lumen output of the lamp is less than fifteen (15) seconds. Thus, in an embodiment, the controller 206 may include a simple timer circuit configured to provide electrical current to the heating element 118 for approximately 15 seconds (or less) starting from turn ON of the FL, and then breaking the current connection to the heating element 118.

As mentioned above, in the embodiment of FIG. 1 the resistive heating wire produces enough dissipating heating power to ensure that a high temperature reaches the coating comprising phosphor and amalgam-forming material (on the interior surface of the discharge tube) so as to release its mercury content. This method provides for mercury diffusion to start when the FL is turned ON in the entire volume of the cavity to produce instant light during run-up in contrast to the conventional FLs equipped with traditional auxiliary amalgam. Such traditional auxiliary amalgam compositions result in the lamp gradually becoming brighter from the cathodes on either end of the lamp towards the colder, middle section or middle sections of the discharge lamp. In accordance with the embodiments described herein, the heating element 118 does not significantly detract from the transparency of the discharge tube 102. In particular, a thin wire may be utilized as the heating element that does not block any significant amount of light from exiting the discharge tube or envelope.

Figure 3:
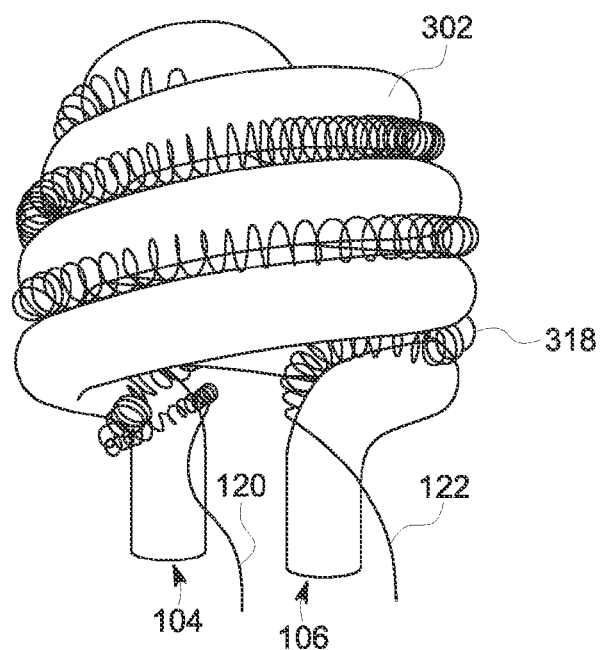
FIG. 3 illustrates a spiraled compact fluorescent lamp (CFL) including a spiral-wire heating element according to an embodiment of the invention.

Although the FL 100 is shown as being tubular in FIGS. 1 and 2, it should be understood that other discharge tube shapes may be utilized. For example, FIG. 3 shows a spiraled CFL tube configuration, which configuration is designed to fit into a conventional lamp fixture that could be used, for example, in a person's home. The CFL includes a spiral shaped discharge tube 302 having a first end 104 and a second end 106. First heating electrode 120 disposed on the first end 104 of the CFL and second heating electrode 122 disposed on the second end 106 of the CFL are shown connected to a spiral-wire heating element 318 which has been wrapped around and is contacting the spiral shaped discharge tube 302. Thus, the pre-coiled wire is arranged to contact all of the coils of the spiral shaped discharge tube 302. It should be understood that other tube shapes, such as folded and the like, may but be utilized as desired.

Figure 4:
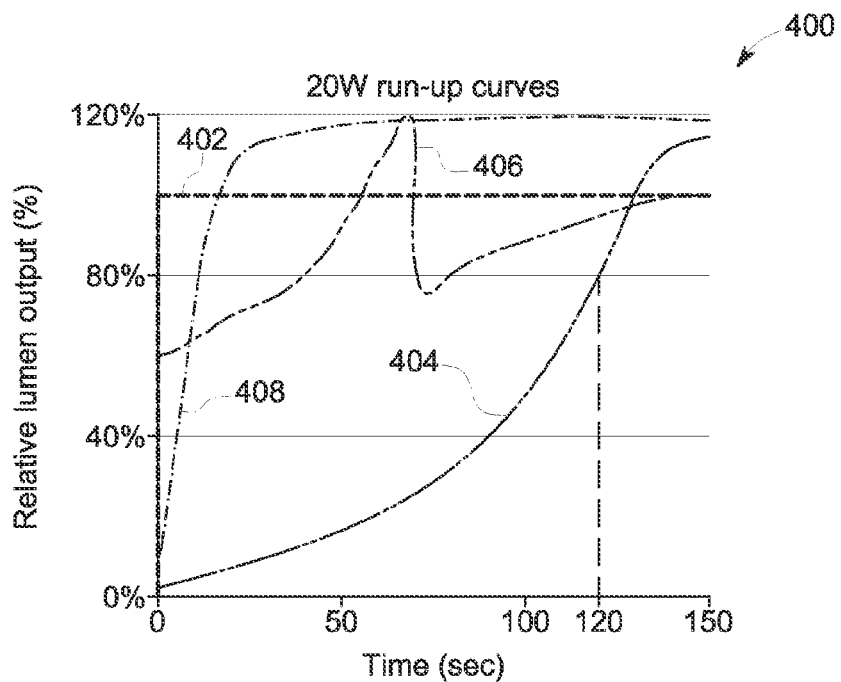
FIG. 4 is a chart depicting the relative lumen output in percentages on the y-axis and the time in seconds on the x-axis for a twenty-watt (20 W) fluorescent lamp according to an embodiment of the invention.

FIG. 4 is a chart 400 depicting the relative lumen output in percentages on the y-axis and the time in seconds on the x-axis for a twenty-watt (20 W) FL. The dotted-line curve 402 plots an ideal "instant ON" curve, wherein the FL reaches one hundred percent (100%) of its lumen output at time zero (when the turn-ON switch is switched to apply power to the lamp). The curve 404 illustrates a standard FL turn-ON curve, wherein the FL reaches eighty percent (80%) of its lumen output at about 120 seconds. The curve 406 illustrates the run-up time for a CFL equipped with a halogen light bulb, which reaches 80% of its lumen output at about just under 50 seconds. Lastly, the curve 408 illustrates the run-up time for a FL according to the embodiments described herein which include an external heating element. The run-up curve 408 shows that a FL having an external heating element according to some embodiments reaches 80% of its lumen output at about 15 seconds or less.

Figure 5:
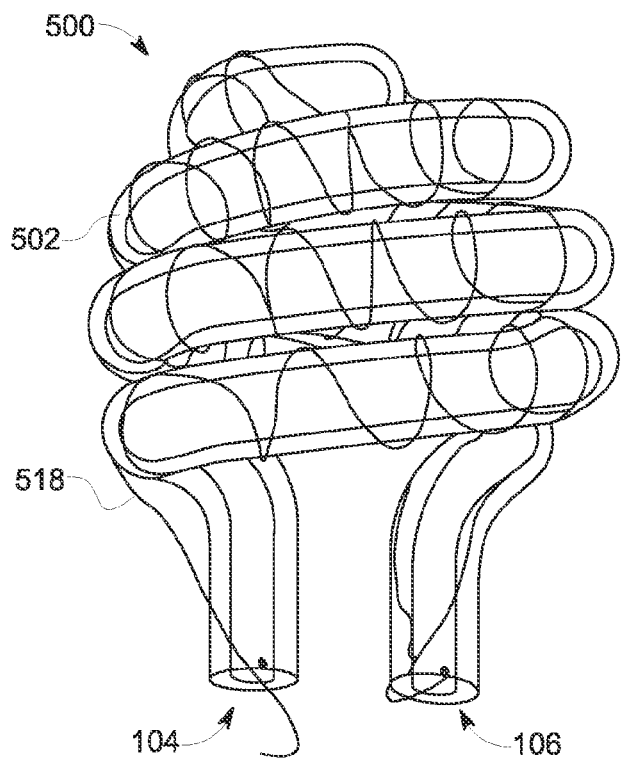
FIG. 5 illustrates another configuration of a spiraled CFL with a wire heating element wrapped around and contacting the coils of the discharge tube according to an embodiment of the invention.

FIG. 5 shows an embodiment of a spiraled CFL tube 500, which configuration may be designed to fit into a conventional lamp fixture. The CFL 500 includes a spiral shaped discharge tube 502 having a first end 104 and a second end 106. A wire heating element 518 is shown wrapped around and contacting the coils of the discharge tube 502. Thus, the wire heating element is arranged along the entire length of the discharge tube 502 and operates to heat the discharge tube when the CFL is initially switched ON as described herein.

Figure 6:
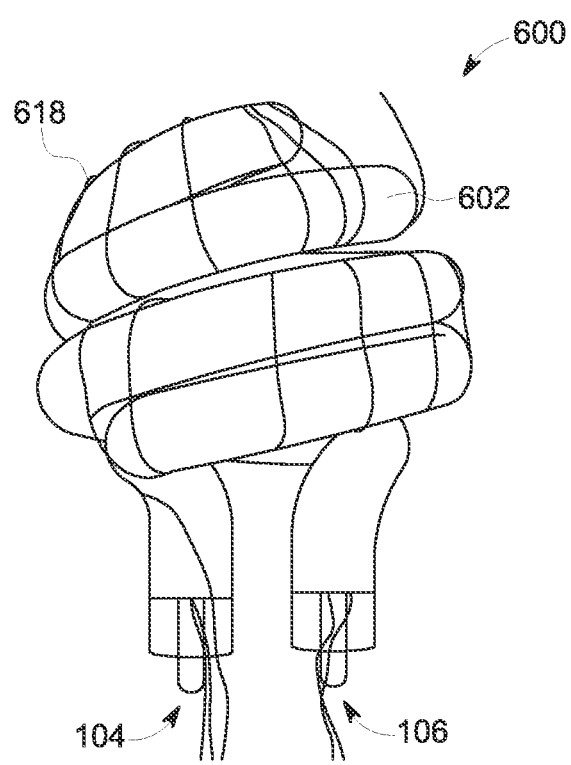
FIG. 6 illustrates yet another configuration of a spiraled CFL with a wire heating element wrapped around and contacting pairs of coils of the discharge tube according to an embodiment of the invention.

FIG. 6 shows another embodiment of a spiraled CFL tube 600, which configuration may be designed to fit into a conventional lamp fixture. The CFL 600 includes a spiral shaped discharge tube 602 having a first end 104 and a second end 106. A wire heating element 618 is shown wrapped around and contacting pairs of the coils of the discharge tube 602. Thus, the wire heating element is arranged along the entire length of the discharge tube 602 and operates to heat the discharge tube when the CFL is initially switched ON as described herein.

Figure 7:
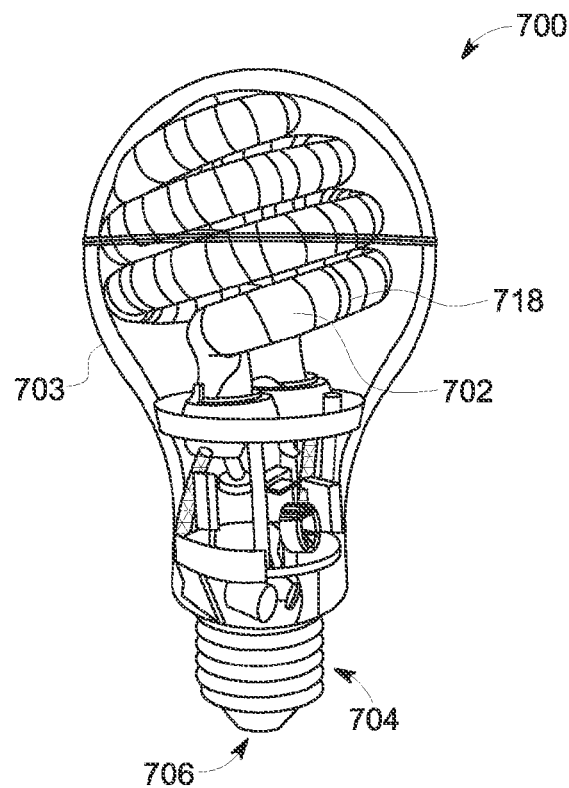
FIG. 7 shows a spiraled CFL with a wire heating element wrapped around and contacting the coils of the discharge tube and having an outer transparent casing according to an embodiment of the invention.

FIG. 7 shows a spiraled CFL 700 embodiment that includes an outer transparent casing 703, a screw cap 704 and an electrical contact 706, which configuration may be designed to fit into a conventional lamp fixture. The CFL 700 includes a spiral shaped discharge tube 702 having a first end 104 and a second end 106. A wire heating element 718 is shown wrapped around and contacting the coils of the discharge tube discharge tube 702 in a manner similar to that shown in FIG. 5. Thus, the wire heating element is thus arranged along the entire length of the discharge tube 702 and operates to heat the discharge tube when the CFL is initially switched ON as described herein so that light will travel outward through the transparent casing 703. The transparent casing may be composed of glass, plastic or any other transparent or translucent material which allows light generated by the discharge tube 702 to pass through.

Figure 8:
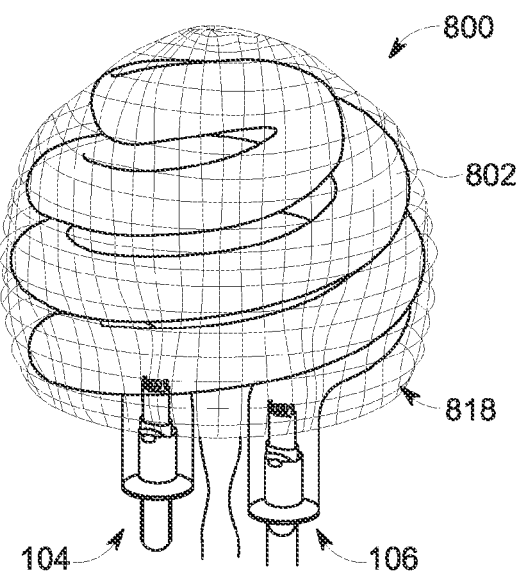
FIG. 8 illustrates a spiraled CFL having a net-shaped resistive heating element that surrounds the outside portions of the coils of the discharge tube according to an embodiment of the invention.

FIG. 8 illustrates an embodiment of a spiraled CFL tube 800, which configuration may be designed to fit into a conventional lamp fixture. The CFL 800 includes a spiral shaped discharge tube 802 having a first end 104 and a second end 106. A net-shaped resistive heating element 818 surrounds or encircles the outside portions of the coils of the discharge tube 802. The net-shaped resistive heating element can be made of any material that resists heat and includes a resistive heating wire that may be formed as a grid. As shown, the net-shaped wire heating element 818 is arranged about and contacts the outside portion of the discharge tube 802, and operates to generate heat that is directed toward the discharge tube when the CFL is initially switched ON as described herein.

In the present disclosure, when a layer is described as being "on" or "over" another layer or substrate, it is to be understood that the layers can either be directly contacting each other or have another layer or feature therebetween, unless expressly stated to the contrary. Thus, such terms are simply describing the relative position of the layers to each other and do not necessarily mean "on top of" since relative position above or below depends on the orientation of the device to the viewer.

The above description and/or the accompanying drawings are not meant to imply a fixed order or sequence of steps for any process referred to herein; rather any process may be performed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A discharge lamp comprising:
    a light-transmissive discharge tube extending from a first end to a second end and having an inner surface and an outer surface;
    a coating comprising at least a phosphor layered onto the inner surface of the discharge tube;
    a fill gas composition capable of sustaining a discharge sealed within the discharge tube; and
    a resistive heating wire positioned about the outer surface of the discharge tube.

2. The discharge lamp of claim 1, further comprising a lamp driver circuit operatively connected to first and second electrodes disposed within the discharge tube, and operatively connected to the external resistive heating wire.

3. The discharge lamp of claim 2, wherein the lamp driver circuit comprises:
    a discharge driver connected to the first and second electrodes; and
    a heating element driver operatively connected to the external resistive heating wire.

4. The discharge lamp of claim 3, wherein the heating element driver includes a controller.

5. The discharge lamp of claim 1, wherein the external resistive heating wire comprises a pre-coiled wire arranged about the outside wall of the light transmissive discharge tube.

6. The discharge lamp of claim 1, wherein the external resistive heating wire comprises a resistive wire wrapped about and contacting the length of the outer surface of the light transmissive discharge tube.

7. The discharge lamp of claim 1, wherein the external resistive heating wire comprises a resistive wire mesh net that encircles and contacts the outer surface of the light transmissive discharge tube.

8. The discharge lamp of claim 1, wherein the coating comprises a mixture of amalgam-forming material and phosphor.

9. The discharge lamp of claim 8, wherein the phosphor coating further comprises at least one amalgam-forming material.

10. The discharge lamp of claim 8, wherein the phosphor comprises a blend of phosphors.

11. A method of forming a fluorescent lamp, comprising:
    providing a discharge tube having a first electrode on a first end and a second electrode on a second end for exciting a fill gas contained within an inner cavity of the discharge tube to produce light, the discharge tube having a first end and a second end, and an inner surface and an outer surface;
    providing a resistive heating wire about the outer surface of the discharge tube; and
    providing a driver circuit comprising a lamp driver and a heating driver, wherein the lamp driver is operably connected to provide power to the first electrode and the second electrode, and the heating driver is operably connected to provide power to the resistive heating wire to heat the discharge tube.

12. The method of claim 11, further comprising providing an amalgam-forming material and phosphor coating layered onto the inner surface of the discharge tube.

13. The method of claim 11, further comprising:
    operating the lamp driver when the fluorescent lamp is turned ON to provide power to illuminate the lamp;
    operating the heating driver when the fluorescent lamp is turned ON to provide power to the resistive heating wire to heat the discharge tube; and
    disconnecting, by the heating driver, power from the external resistive heating wire when the lamp achieves a predetermined percentage of its stabilized lumen output.

14. The method of claim 13, wherein disconnecting power from the resistive heating wire occurs when the lamp attains a predefined percentage of its stabilized lumen output.

15. The method of claim 11, wherein providing the resistive heating wire comprises arranging a pre-coiled wire in contact with and about the outside wall of the light transmissive discharge tube.

16. The method of claim 11, wherein providing the resistive heating wire comprises wrapping the resistive heating wire about the length of the outer surface of the light transmissive discharge tube.

17. The method of claim 11, wherein providing the resistive heating wire comprises providing a resistive wire mesh net and attaching the resistive wire mesh net to encircle and contact the outer surface of the light transmissive discharge tube.

* * * * *

UNITED STATES PATENT AND TRADEMARK OFFICE
CERTIFICATE OF CORRECTION

PATENT NO.        : 8,633,645 B2                                         Page 1 of 1
APPLICATION NO.   : 13/860615
DATED             : January 21, 2014
INVENTOR(S)       : Koronya et al.

It is certified that error appears in the above-identified patent and that said Letters Patent is hereby corrected as shown below:

On the title page, item (73), under "Assignee", in Column 1, Line 2, delete "Schenectady, NV (US)" and insert -- Schenectady, NY (US) --, therefor.

Signed and Sealed this
Eighteenth Day of March, 2014

Michelle K. Lee
*Deputy Director of the United States Patent and Trademark Office*